A. H. NEUREUTHER.
AUTOMATIC PINION CUTTING MACHINE.
APPLICATION FILED MAY 21, 1907.
937,259. Patented Oct. 19, 1909.
12 SHEETS—SHEET 1.
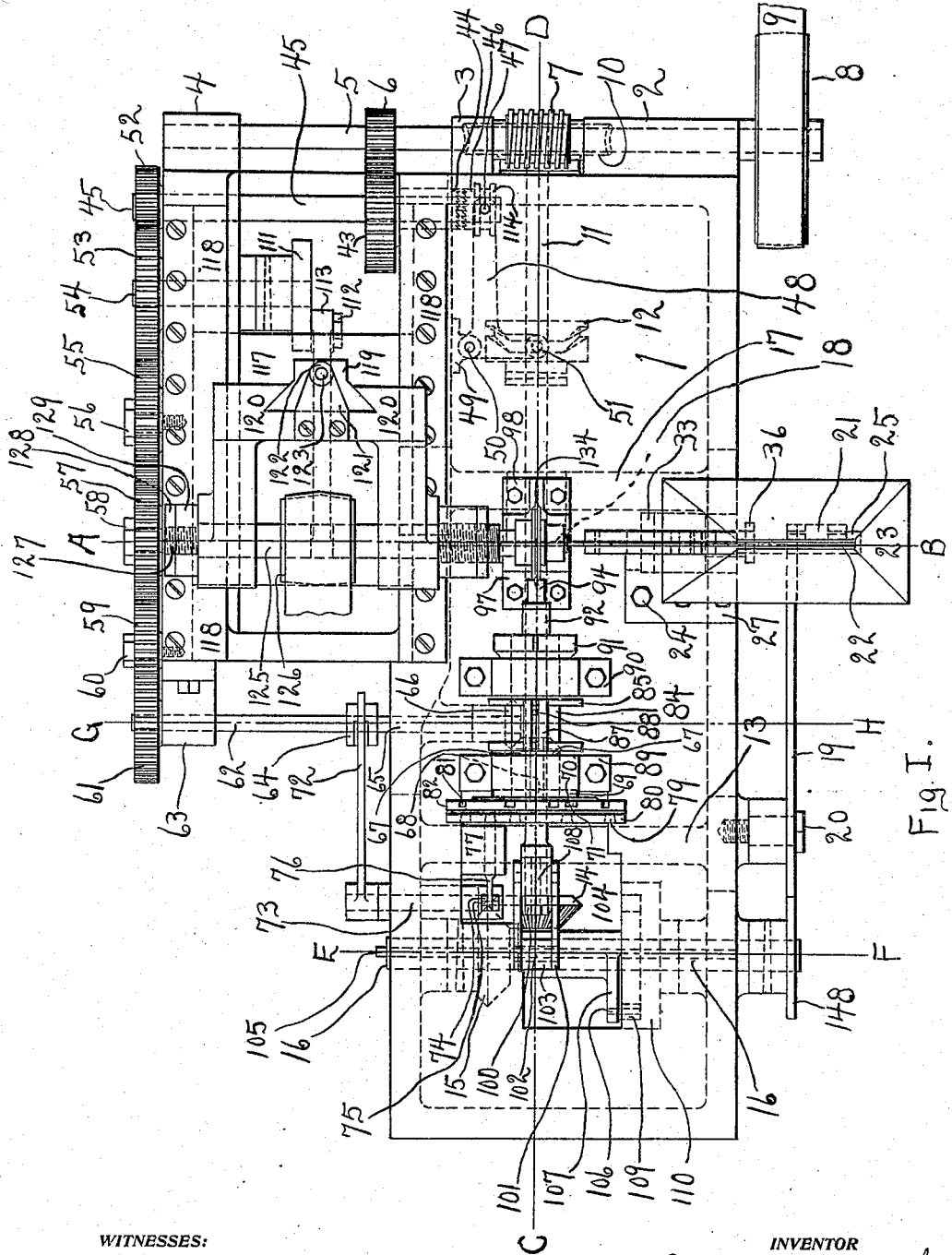
Fig. I.
WITNESSES:
F. Guy Moore
William A. Radtke
INVENTOR
Andrew H. Neureuther

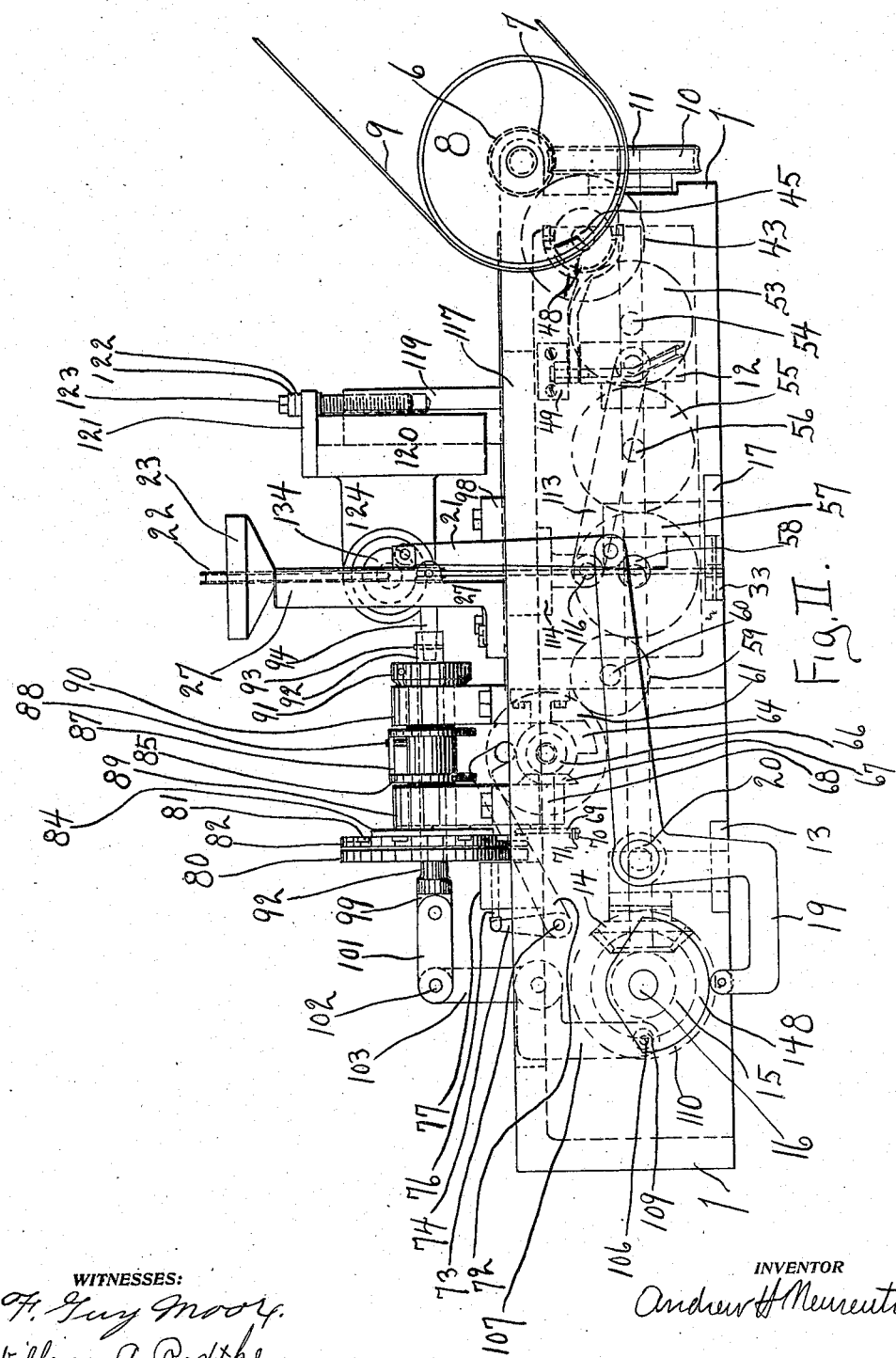

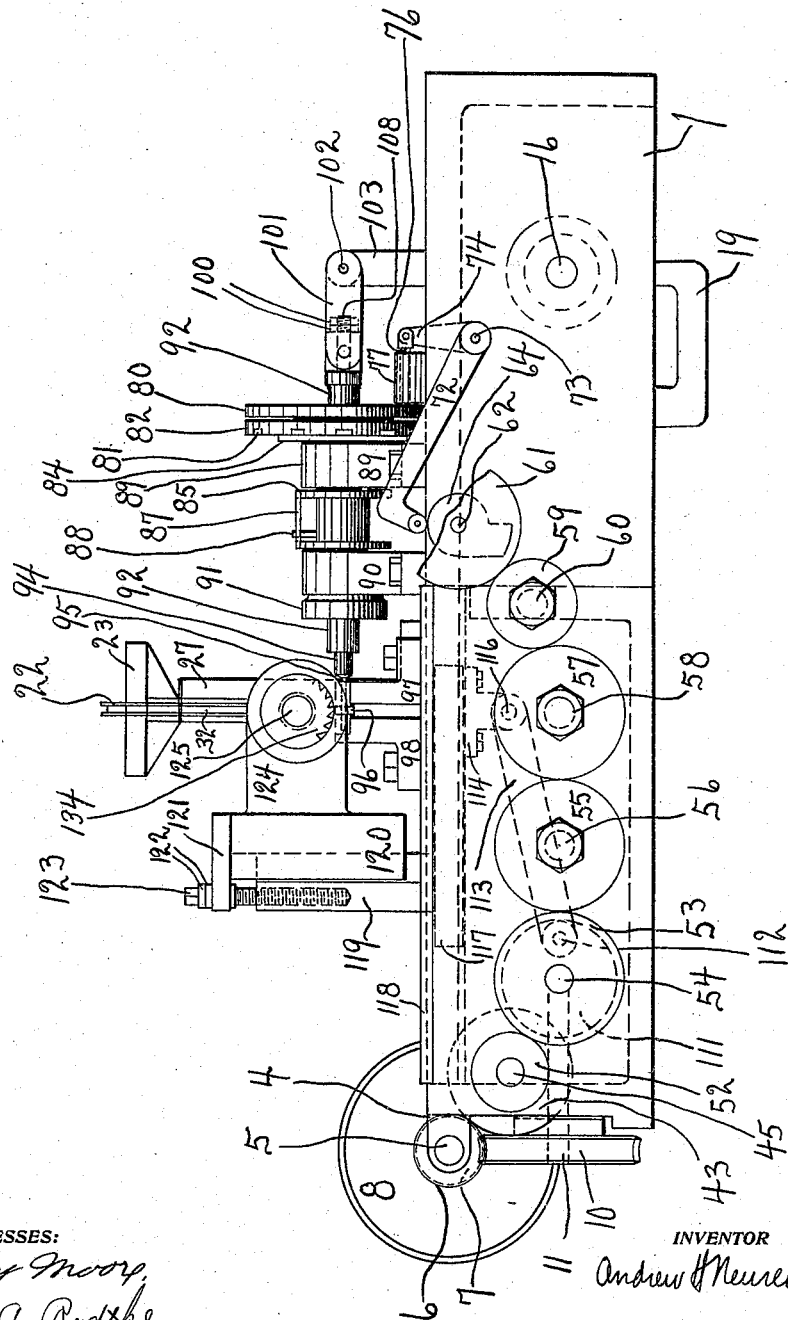

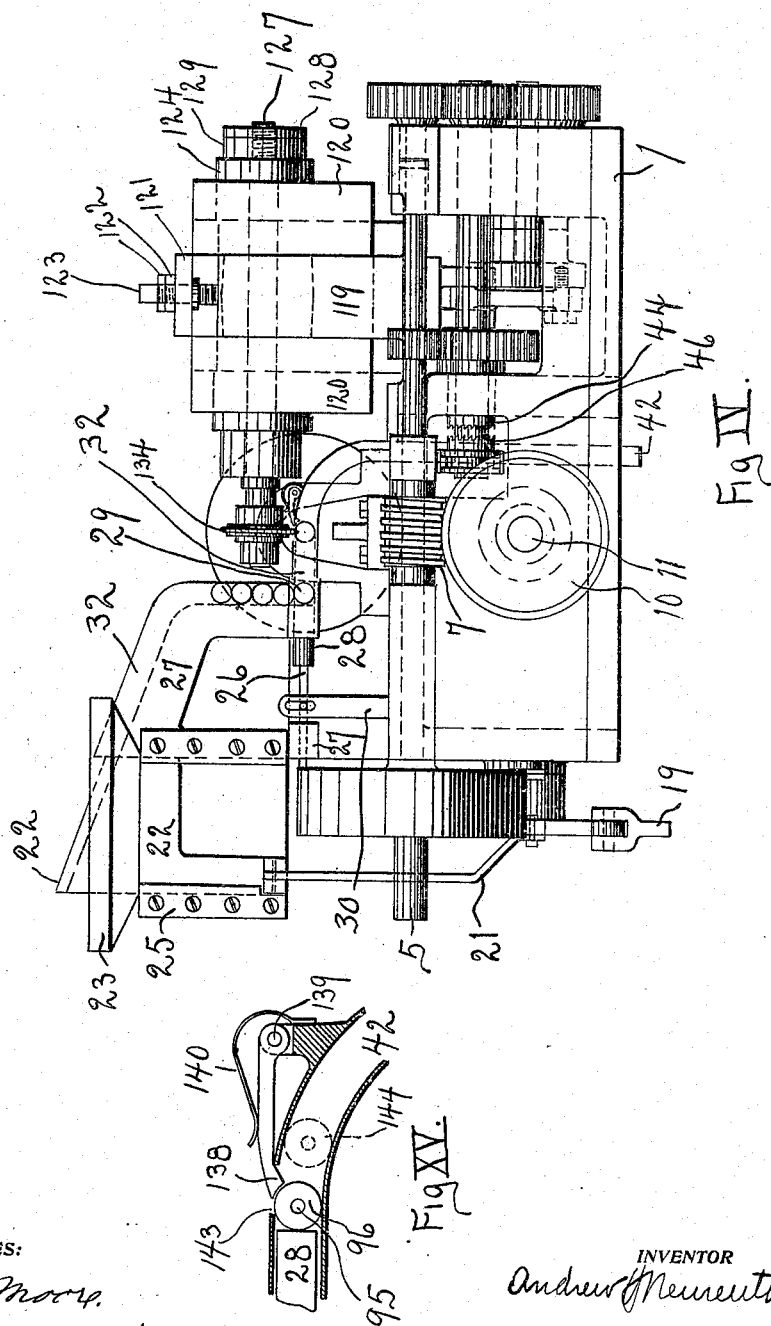

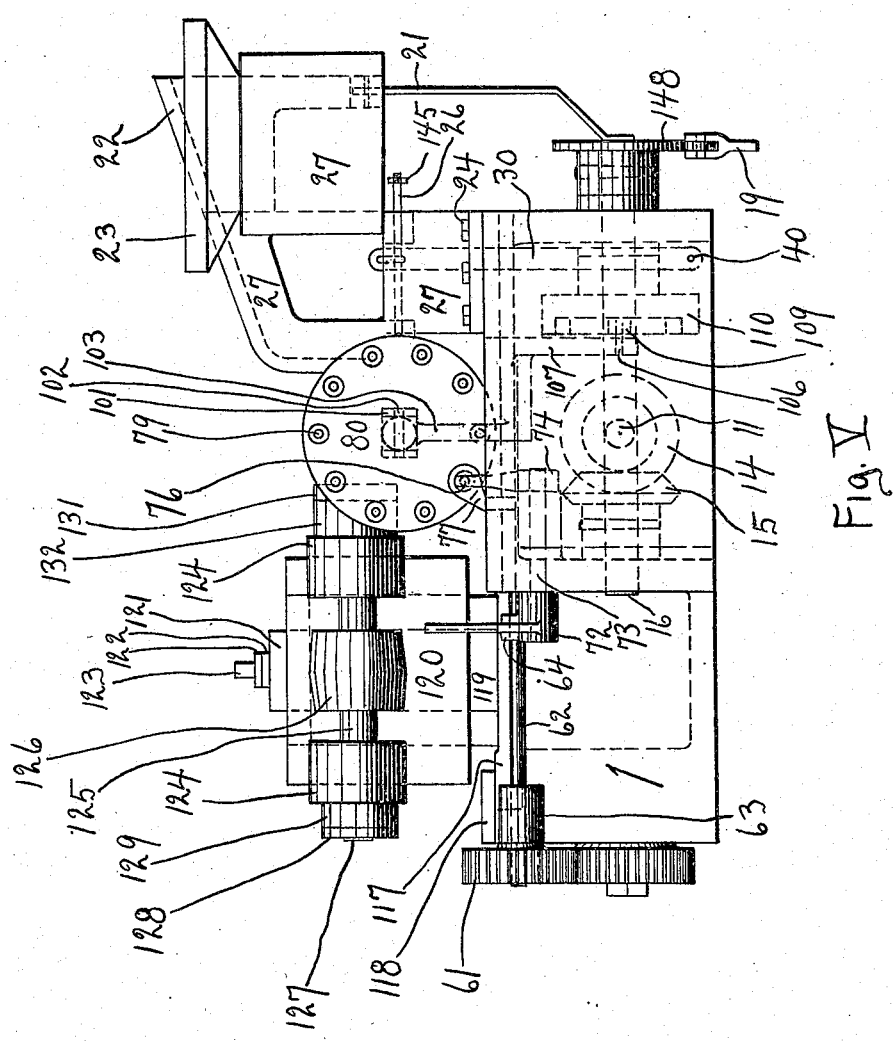

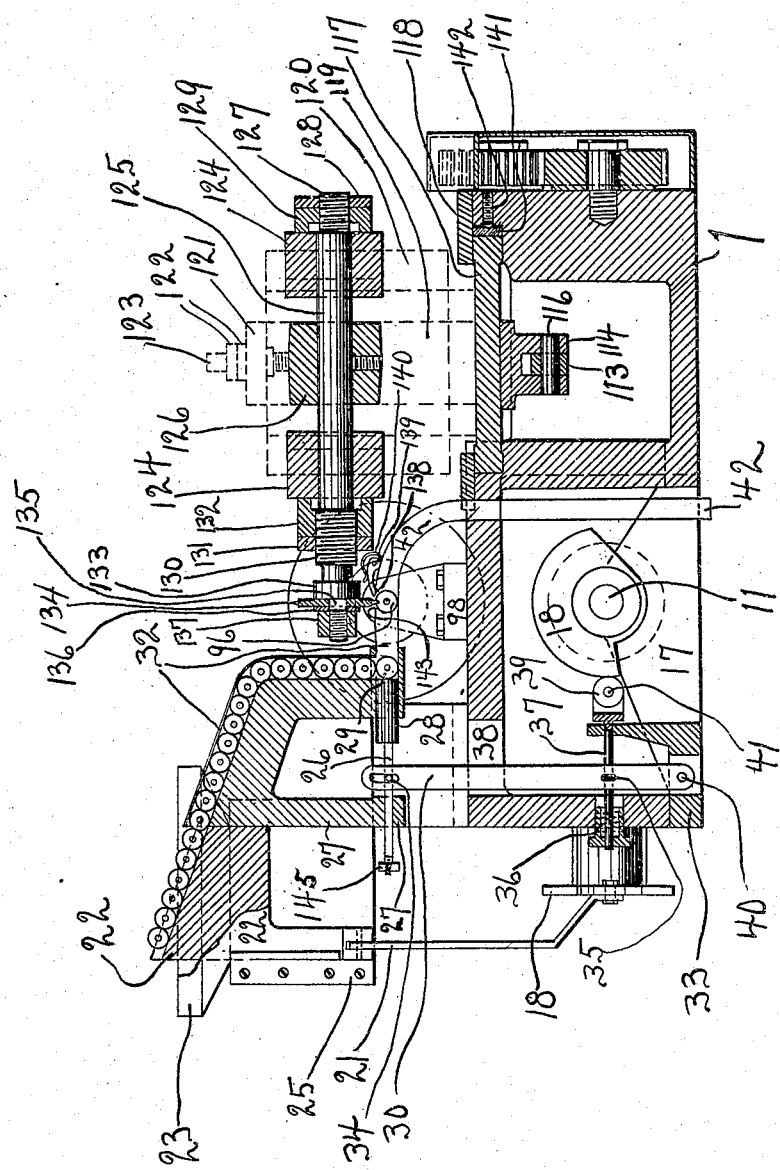

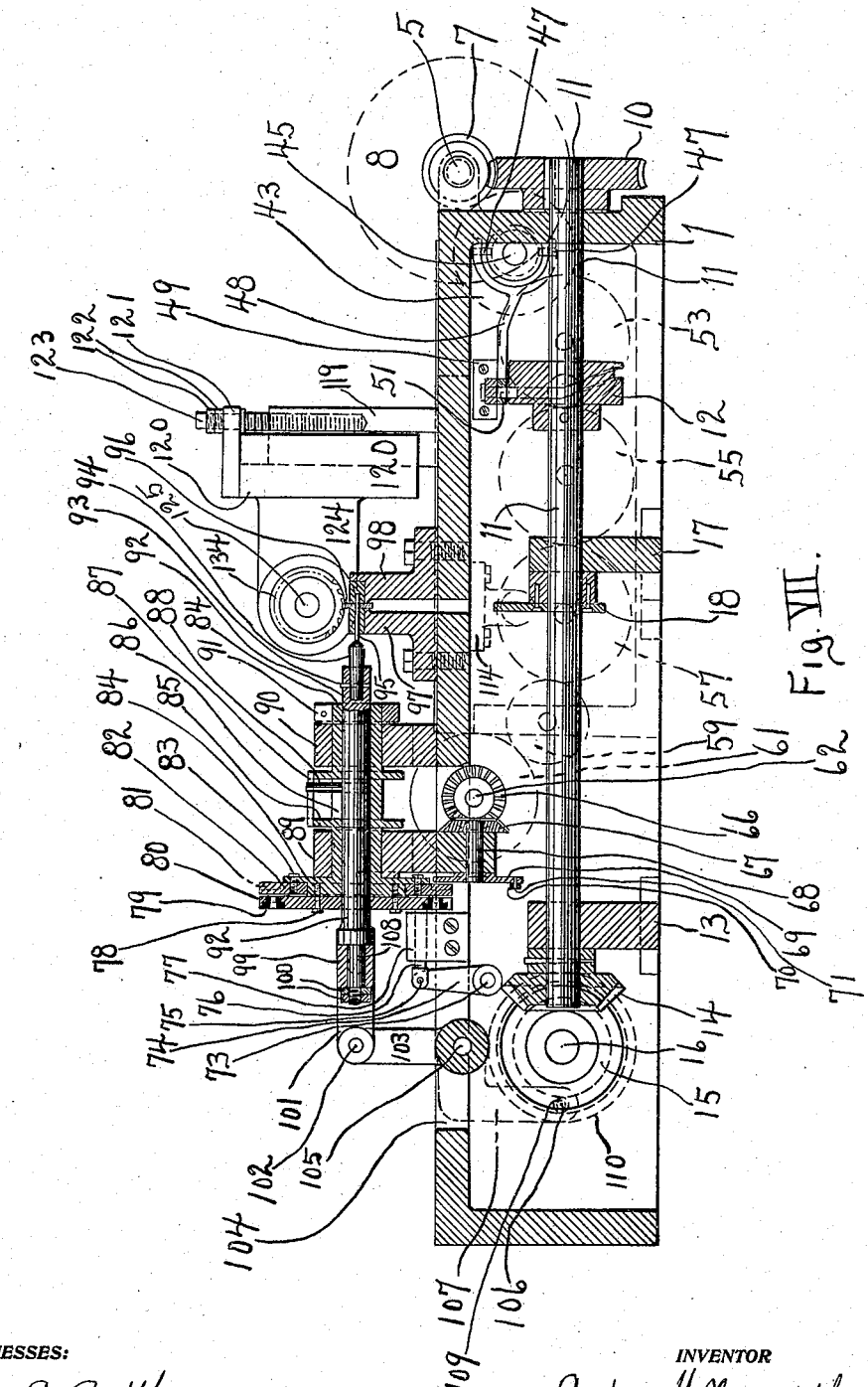

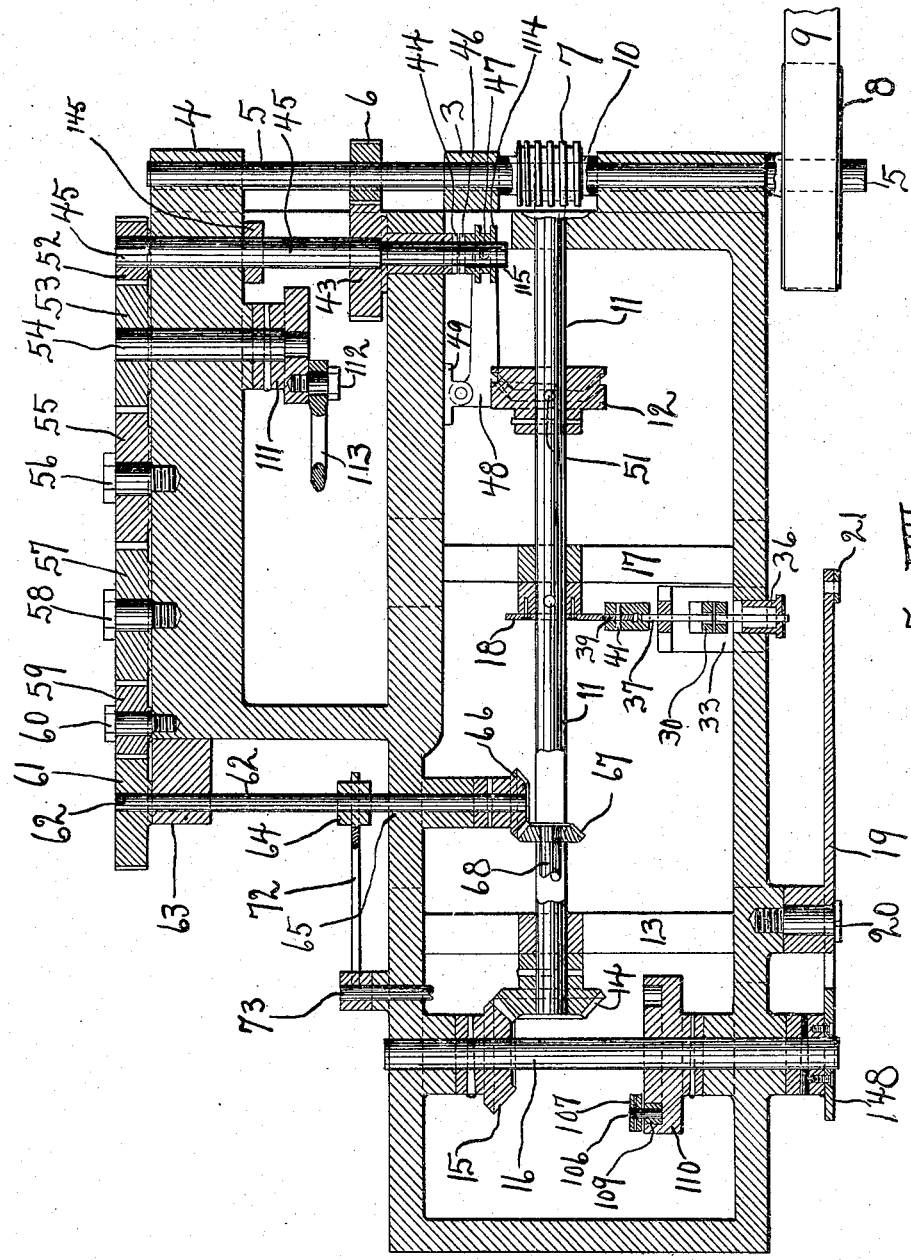

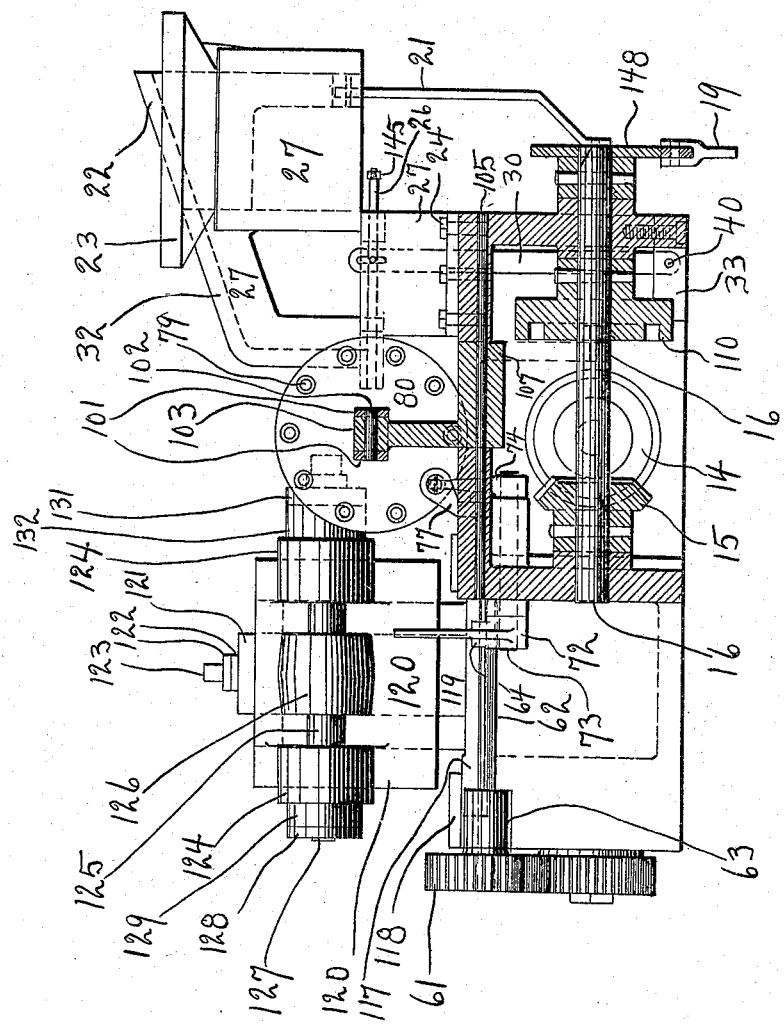

A. H. NEUREUTHER.
AUTOMATIC PINION CUTTING MACHINE.
APPLICATION FILED MAY 21, 1907.
937,259.
Patented Oct. 19, 1909.
12 SHEETS—SHEET 10.
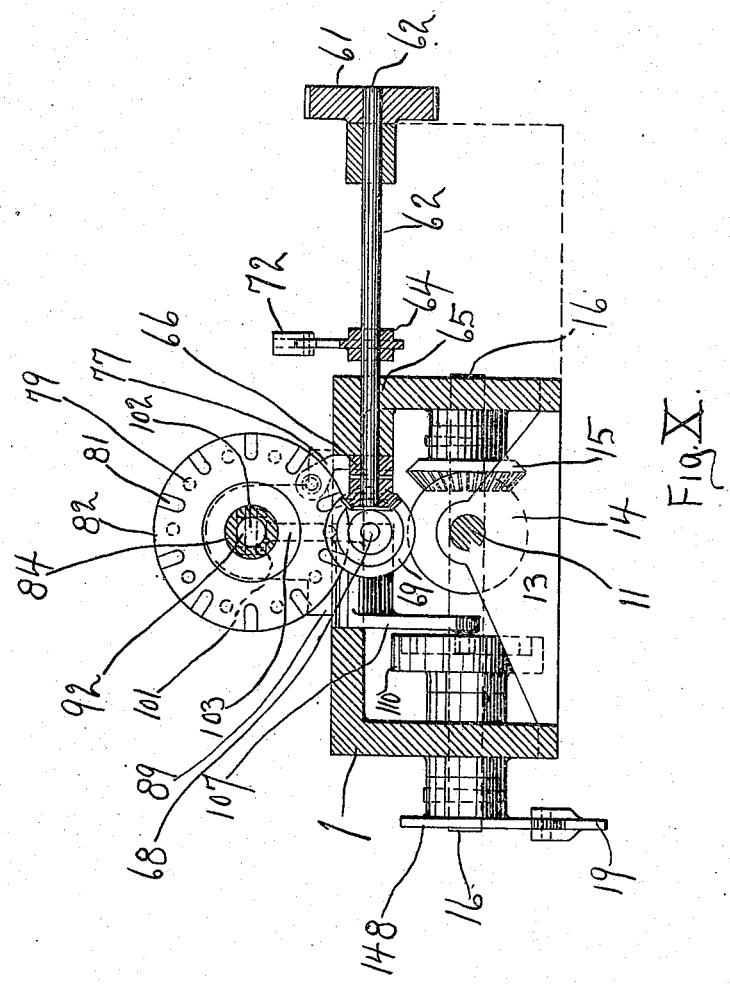
WITNESSES:
INVENTOR

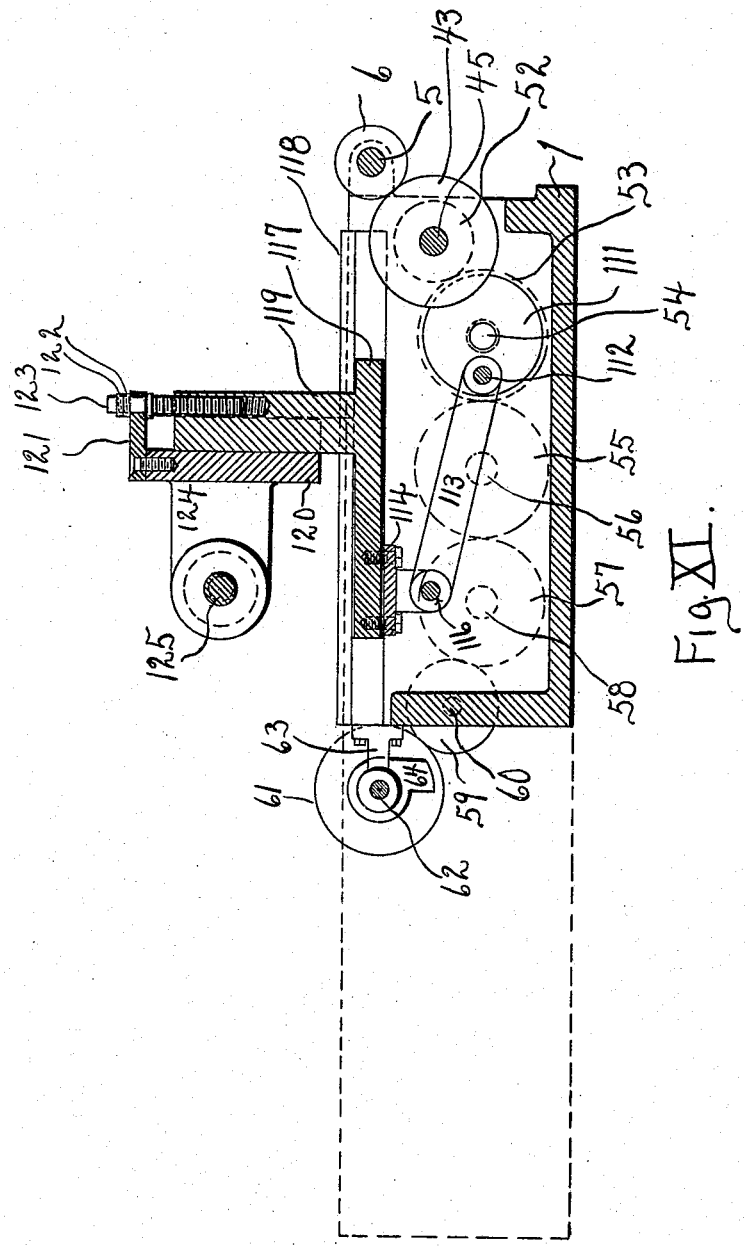

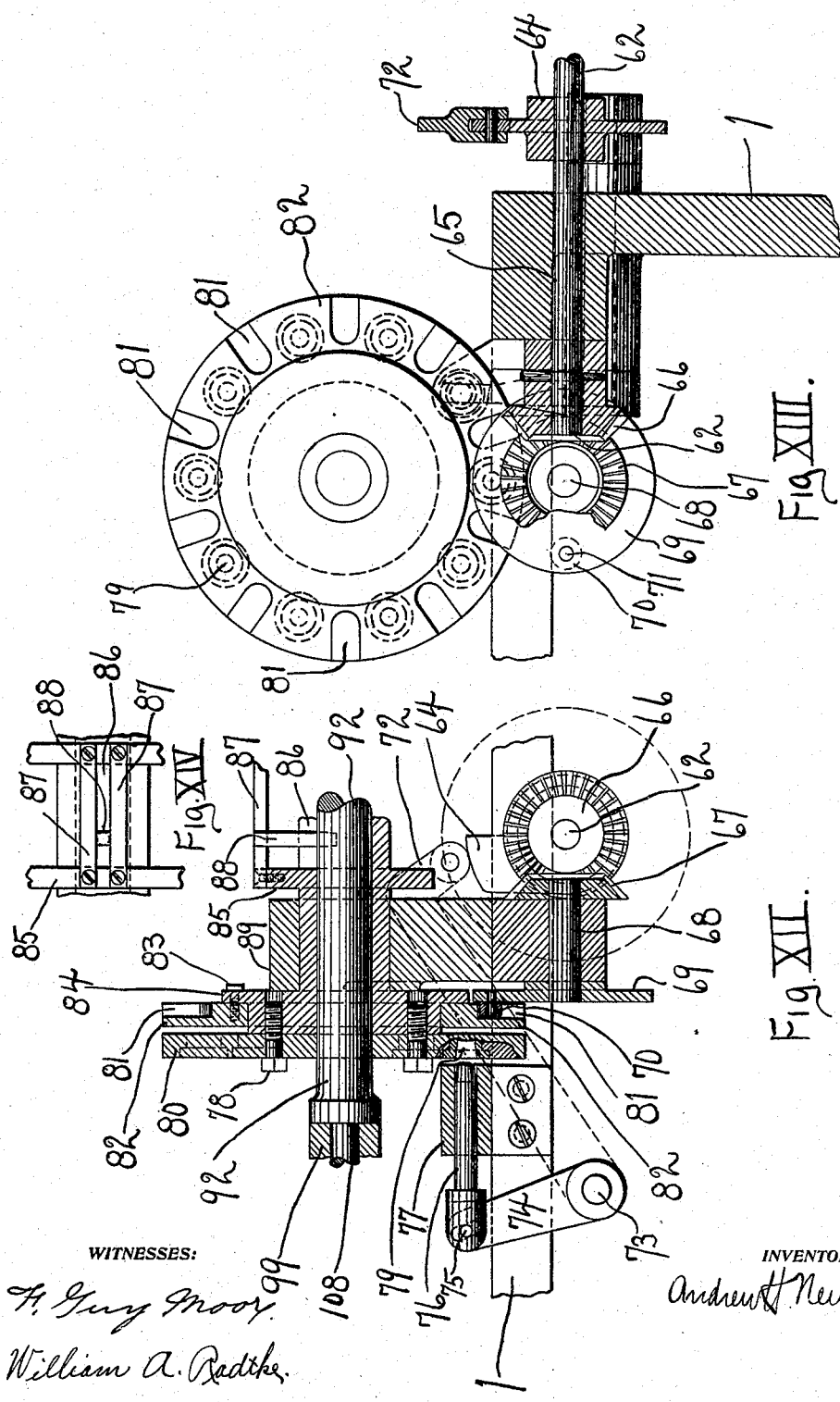

UNITED STATES PATENT OFFICE.

ANDREW H. NEUREUTHER, OF PERU, ILLINOIS, ASSIGNOR TO THE WESTERN CLOCK MANUFACTURING COMPANY, OF LA SALLE, ILLINOIS, A CORPORATION OF ILLINOIS.

AUTOMATIC PINION-CUTTING MACHINE.

937,259. Specification of Letters Patent. Patented Oct. 19, 1909.

Application filed May 21, 1907. Serial No. 374,934.

*To all whom it may concern:*

Be it known that I, ANDREW H. NEUREUTHER, a citizen of the United States, residing at Peru, in the county of Lasalle and State of Illinois, have invented a new and useful Automatic Pinion-Cutting Machine, of which the following is a specification.

My invention relates to machines for cutting the teeth of pinions and gears and has for its object the production of a machine in which it is only necessary to dump any number of pinion blanks into a hopper, when they will be erected (righted), stacked, forced on to an arbor, properly indexed, the teeth formed or cut and the blank again released and conducted from the machine, the entire process being performed by the machine itself, or automatically, making the machine an automatic pinion cutting machine.

My invention further relates to the specific means and devices which will be hereinafter described, shown and claimed.

I attain these objects by the mechanism illustrated in the accompanying drawings, in which—

Figure I is a top view of my automatic pinion cutting machine, Fig. II is a right-hand side view, Fig. III is a left-hand side view, Fig. IV is a front end view of my machine, Fig. V is a rear end view of my machine, Fig. VI is a vertical cross-sectional view through the feeding device, along a line A—B of Fig. I, seen from the front, Fig. VII is a vertical sectional view along a line C—D, Fig. I, Fig. VIII is a horizontal sectional view through the shafts and frame, showing the arrangement of the shafts, gears, cams, clutches etc., Fig. IX is a vertical cross-sectional view along a line E—F, Fig. I, viewed from the back of the machine, Fig. X is a vertical cross-sectional view along a line G—H, Fig. I, viewed from the front of the machine, Fig. XI is a vertical sectional view through the cutter slide viewed from the right-hand side of the machine, Fig. XII is an enlarged vertical sectional view through the arbor showing how it is slidably connected with the indexing mechanism and showing method of indexing and locking the arbor. Fig. XIII is a front view of Fig. XII, showing actuating shaft and index locking cam in section, Fig. XIV is a top view of the part of Fig. XII showing the construction of the sliding connection between the arbor and the indexing mechanism. Fig. XV is an enlarged cross-sectional view of the spring loaded gage for lining the blank with the arbor.

In the drawing, 1 represents the frame of my machine, 2, 3, and 4 are bearings in the frame 1 which journal the shaft 5 by means of which the entire driving mechanism of the machine is driven by means of pulley 8 and belt 9. Rigidly fastened to shaft 5 is a worm 7, which engages a worm wheel 10 which is rigidly fastened to a shaft 11, which is journaled in the front end of the frame 1 and in bracket bearings 13 and 17 fastened to the frame of the machine (see Fig. VIII). Shaft 11 terminates with a bevel gear 14 which engages with a bevel gear 15 which is rigidly mounted on a shaft 16 which is journaled in the frame of the machine as shown. Shaft 16 carries cams 110 and 148, both rigidly fastened to it by means of the pins shown (see Figs. VIII and IX). Cam 110 has a groove which carries a roll 109 which is journaled on a pin 106 which is rigidly fastened to a lever 107, which is journaled on a pin 105 mounted in the frame of the machine (see Figs. VII and IX). The upper end of lever 107 terminates into a projection 103, which has an aperture through which passes a pin 102. On this pin 102 are journaled two links 101 whose other ends have apertures which are journaled on pins projecting from the collar 99, also journaled on the projecting part 108 of arbor 92. Nuts 100 retain said collar 99 in its proper position as shown. From this it is seen that cam 110 controls the longitudinal motion and position of arbor 92, causing it to remain stationary or to reciprocate, depending on the form of the groove in cam 110. On shaft 16 is rigidly mounted a cam 148 which actuates a lever 19 journaled on a pin 20 fastened to the frame of the machine. The other end of lever 20 is pivotally connected to a link 21 whose upper end is journaled on a pin fastened in the lower end of sliding member 22. Sliding member 22 is reciprocated vertically by means of cam 148, any number of times per revolution, depending on the form of the said cam 148. Said member 22 as above mentioned slides in the standard 27, which supports a hopper 23 on its upper extremity. The upper end of member 22 is cut off on an angle with the vertical, and has a slot through the entire top surface. The shape of this slot depends on the shape of the pinion or gear blank which it is desired to feed. The hopper 23 is generally filled with the blanks and the sliding member 22 works downward beneath the bottom of the hopper and comes up through the blanks; those which are erected or righted in the slot remain so until, when the sliding member 22 is at its upper limit of travel, the slot in member 22 is brought in line with a runway 32 whose lower vertical part terminates in a horizontal runway, which at once forms a place for the stack of blanks in the vertical runway to rest upon and a guideway for bringing the hole in the blank in line with the arbor end 95 it is forced on to. Horizontal guideway 32 terminates in the curved runway or tube 42, which conducts the finished pinion or gear wheel away from the machine. Guideway 32 has a notch 143 cut out of its upper edge so that the rotating cutter 134 can cut the blank 96 and has openings on each side which permit the small staking end 95 of staking arbor 94, which is fastened to above mentioned reciprocating arbor 92, to pass through said guide or runway and said pinion into the bearing or standard 98, which is rigidly fastened to the frame. The upper part of tube 42 contains a combined blank gaging and releasing mechanism which is composed of a piece 138 shaped as shown (see Fig. XV) journaled to the tube at 139 and held in its normal position by spring 140 as shown in the above mentioned Fig. XV.

28 is a plunger which reciprocates in the horizontal part of runway 32 and is shown in Fig. VI in the act of taking a blank from the stack of blanks, while in Fig. XV plunger 28 is shown placing the blank against the gage 138 after having pushed the blank 144 through the gage as indicated. Plunger 28 has a stem 26 which is journaled in frame 27, and has the end threaded for a nut 145 which serves to adjust the distance plunger 28 is thrown, so as to bring the blank up to the gage 138 and the center hole of the blank in line with staking arbor 95. Plunger 28 is actuated by means of a lever 30 which is pivotally connected to it by pin 34 and pivotally connected by means of pin 40 to the standard 33, which is fastened to the frame of the machine. Said lever 30 is further pivotally connected to a rod 37, which is also journaled in standard 33 and in a bushing which is threaded to the frame of the machine at 36. Immediately after the rod 37 passes through the standard 33 it is formed into a slot which carries a roll 39, which is journaled on a pin 41 fastened in the said rod 37. On the other end of rod 37 is a spiral spring not shown, which keeps the roll 39 against the cam 18 which is rigidly fastened to the shaft 11 above mentioned. From the shape of cam shown, it is evident that lever 30, and hence plunger 28, has an intermittent reciprocating motion, and pushes out or releases a blank and puts another from the stack of blanks in its place. The threaded bushing at 36 serves to screw up the tension of the spring on rod 37. It may be noted here that when the runway is full of blanks as shown in Fig. VI, the blanks simply ride up and down on the sliding member 22 until there is room for one or more blanks in the stationary runway. 25 is the guide plate on standard 27 to retain the sliding member 22 in its position.

The arbor 92 as above mentioned has an intermittent reciprocating motion, moving forward when forcing on a blank against the standard 98, in which the end 95 of arbor 92 is journaled, and backward into the standard 98 in which it is also journaled, thereby releasing the blank from the arbor end 95 and leaving it free to be forced through the gage 138 by plunger 28.

On shaft 11 is mounted cam 12 which actuates a bell crank lever 48 by means of a pin 51 in one end, which travels in the groove of cam 12. Lever 48 is pivotally connected to a standard 49 which is fastened to the frame 1. The other end of lever 48 actuates a clutch jaw 114 by means of pins 47 (see Fig. VIII) which is slidably mounted on shaft 45 by means of a key 115 fastened to said shaft. It will be seen that although clutch jaw 114 can move along the length of the shaft 45, when it rotates it will rotate the shaft 45 with it. Clutch jaw 114 has teeth 46 cut on one end. Journaled on this shaft 45 and in the frame 1 is a gear wheel 43 which engages and is rotated by gear 6 rigidly mounted on the main driving shaft 5. Gear 43 has rigidly fastened to it clutch jaw teeth 44, conforming to the clutch jaw teeth 46. It is evident that gear 43, since it is geared to shaft 5, will have a continuous rotary motion about shaft 45 as an axis. The function of cam 12 is to move the clutch jaw 114 in and out of engagement with the clutch jaw teeth 44 on gear 45. When the jaw teeth mentioned are apart, it is evident that shaft 45 will not rotate. When they are in or engaged, shaft 45 will rotate with gear 43. A collar 145 on shaft 45 serves to keep the parts in position as shown. Mounted on the outer end of shaft 45 (see Fig. VIII) is fastened a gear 52 which engages with a gear 53, rigidly mounted on a shaft 54 which is journaled in the frame as shown. Fastened to shaft 54 is a crank plate 111 which carries a crank pin 112 on which is journaled one end of connecting rod 113. The other end of connecting rod 113 is journaled on a pin 116 fastened in the standard 114, which is fastened to the sliding member or crosshead 117 (see Figs. VI and IX), which is slidably mounted in the frame 1 and held in position by means of cover plates 118, gib 141 and gib screws 142.

From the above description and the drawings, it is evident that when shaft 45 is rotated (when the clutch teeth 46 and 44 are engaged by means of cam 12) by gear 43, the slide 117 will be given a reciprocating motion by means of the crank plate 111, the crank pin 112, connecting rod 113, pin 116 and standard 114, since crank plate 111 will be rotated when shaft 45 is rotated. Rigidly mounted on slide 117 is a standard 119. Adjustably mounted on this standard 119 is a frame 120, the adjustment comprising a plate 121 fastened to said frame, the shouldered screw 123 passing through said plate, having the nuts 122 to take up any back lash, said screw being threaded in the standard 119. Said screw raises and lowers the cutter 134 to get depth of teeth cut.

Projecting from frame 120 are two bearings 124 in which is journaled the cutter arbor 125, which carries the gear cutter 134, which passes through the blank 96 when slide 117 reciprocates as above mentioned. Shaft 125 also has mounted on it the belt pulley 126, by means of which it is driven.

Cutter arbor 125 has threaded portions 127, 130, on which are nuts 129, 132 and lock nuts 128 and 131, which serve as means for moving cutter 134 toward either side, so as to bring it central with the blank 96 and also to take up the side back lash on said arbor.

Gear 53 above mentioned (see Fig. VIII) meshes into a gear 55 which is journaled on a pin 56, fastened to the frame 1. This gear 55 meshes with a gear 57 journaled on a pin 58; gear 57 meshes with a gear 59 which is similarly journaled on a pin 60 and gear 59 meshes with gear 61 which is fastened to the shaft 62. Shaft 62 is journaled in the frame 1 at 65 and in the standard 63 fastened to frame 1. From the method of connecting shafts 54 and 62 by the gearing shown, it is evident that these shafts rotate in unison, viz., each completes a rotation in the same time.

Shaft 62 carries a cam 64 mounted on it between its bearings whose function will be explained further along. Shaft 62 also has a bevel gear 66 mounted on it on the end opposite spur gear 61. This bevel gear 66 meshes with a similar gear 67 which is fastened to a shaft 68 (see Figs. VII, XII and XIII) which is journaled in the frame 1 as shown. On the other end of the shaft 68 is fastened a crank plate 69 carrying a roll 70 journaled on a pin 71 fastened near its periphery.

It is evident from the manner in which crank plate 69 is connected with shaft 62 that it rotates in unison with it. As crank plate 69 rotates, the roll 70 (see Figs. XII and XIII) engages and enters into the radial slots 81 in the periphery of the motion plate 82 (as shown in Fig. XII) and carries said plate 82 through a partial rotation, depending on the number of slots in said motion plate. The number of said slots 81 in the motion plate 82 is equal to the number of teeth to be cut in the pinion, said slots being equally spaced as shown in Fig. XIII. Motion plate 82 is fastened to a shouldered sleeve 84 by means of bolts 83 (see Figs. VII and XII). Sleeve 84 is journaled in standards 90 and 89, each of which is fastened to the frame 1. 91 is a split nut on sleeve 84 by means of which it can be adjusted so that the end motion can be taken up.

In back of motion plate 82 and fastened to shouldered sleeve 84 by means of bolts 78, is the index or locking plate 80, which carries the same number of equally spaced tapered bushings 79 as there are slots 81 in the motion plate 82. Said index plate 80 with its tapered bushings 79 serves as a means for locking the shouldered sleeve 84 between each successive rotation of same by the crank plate roller 70 and the slots 81 in motion plate 80. Said locking is accomplished by means of the index pin 76, which is journaled in a standard 77 which is fastened to the frame 1 (see Fig. XII). Index pin 76 has one end tapered, which permits it to fall into the tapered bushing 79 to index plate 80, even though the centers of pin and hole are not exactly in line. The other end of index pin 76 is pivotally connected to a lever 74 by means of pin 75. Lever 74 is fastened to a shaft 73 journaled in the frame 1. The outer end of shaft 73 is fastened to a lever 72 whose other end carries a roll journaled on a pin fastened in the lever, said roll engaging with the above mentioned cam 64, which is fastened to shaft 62. The cam 64 is so shaped and timed in relation with roll 70 on crank plate 69, that it pulls index pin 76 just before roll 70 enters the slot 81 in motion plate 82 and again permits index pin 76 to pass into one of the tapered bushings 79, thereby locking shouldered sleeve 84 just as roll 70 leaves the slot 81 after partially rotating the shouldered sleeve 84. It will be well to note that the sliding member 117 is so timed with reference to the locking of shouldered sleeve 84, that it permits the rotating cutter 134 to pass through the blank 96 while the shouldered sleeve is locked by index pin 76 as above explained.

The arbor 92 is journaled in the axial opening of shouldered sleeve 84 and slidably connected with it by means of a pin 88 fastened to arbor 92, the upper end of pin 88 passing through a slot 86 between the shoulders 85 of said sleeve and operating between the hardened plates 87 (see Fig. XIV), which are fastened on the shoulders 85 of sleeve 84. By means of the pin 88 and the plates 87, any side wear can be readily taken up, and this arrangement of keeping the bearing point considerably out from the axis eliminates or reduces the error of inaccuracy of the fitting of plates and pin as you go toward the axis, making it possible to have considerable back lash between pin and plates before it will be noticeable in the teeth cut on blank 96.

From the above description it is evident that arbor 92 can have a longitudinal motion in the shouldered sleeve 84 and also that the rotary motion and the locking of this sleeve 84 will also be imparted to the said arbor 92 and consequently to the blank 96 mounted on the end 95 of auxiliary arbor 94, which is fastened to arbor 92 by means of pin 93.

In operation, my machine works as follows:—Pinion blanks are put into hopper 23, the reciprocating sliding member 22 erects or rights them by means of its slot and they run into runway 32 by their own weight and are stacked in the vertical part of 32, when plunger 28 in horizontal part of runway 32 comes in, removes one blank from the bottom of the vertical stack in 32 and forces the blank along until it comes against the spring loaded gage 138 and is held in position by plunger 28 and said gage 138 until cam 110 forces, by means of the intervening linkages, the small end 95 of arbor 92 through the aperture of the blank 96. As soon as the blank is staked, the clutch teeth 44 and 46 are thrown into engagement by means of cam 12 and lever 48 shown, and shaft 45 is rotated, which reciprocates the sliding member 117, which carries the rotating cutter 134 and passes it through the blank 96 and back again, when, as soon as cutter 134 has come back through the blank, the index pin 76 is withdrawn from locking the arbor and the roll 70 enters the slot 81 of motion plate 82, thereby rotating the blank 96 for the next cut. As soon as roll 70 has rotated the blank and is about to leave the slot 81, the pin again locks the arbor 95, when the slide 117 is back again with cutter 134 and cuts another space, forming with the last space cut the first tooth. The process of spacing and cutting the teeth continues until the required number of teeth are cut, when cam 12 disengages the clutch teeth 44 and 46 as sliding member 117 approaches its extreme forward position (away from cutting the blank), when the shaft 45 stops rotation, since it will not have enough momentum after disengaging of clutch teeth to reverse the direction of motion of the sliding member 117. Then the cam 110, through the lever and linkages shown, pulls the arbor 92 back again, sliding the blank 96 against the standard and withdrawing the small arbor end 95 from the blank 96, leaving it free against the gage, when plunger 28 immediately brings in another blank from the stack of blanks in runway 32, which blank forces the cut blank through the spring loaded gage 138 and into the delivery tube 42, where it falls into a receptacle or box for catching the finished work. The new blank brought in plunger 28 is now held against the gage 138 and then staked on the arbor 95, when the process above described is repeated, making the machine entirely automatic in all its parts.

It will be understood, of course, that the various portions of my machine could be used with the others or in connection with features greatly modified. It will also be understood that cams and arrangements of levers and other such operating parts could be greatly modified without departing from the spirit of my invention. In short, I do not wish to be understood as limiting myself to one particular form, arrangement and grouping of these several features, elements or parts; but I have presented here that form of machine which I am now using, with the intention of having it taken in a sense diagrammatic or descriptive of that class of machines which could be produced and any one of which would contain the substance of all or most of my invention.

I claim:

1. In an automatic pinion cutting machine, a sliding member having an intermittent reciprocating motion, with means for giving said sliding member said motion, said means comprising a crank disk, a pin fastened on said disk, a link pivotally connected to said sliding member and said pin, said crank disk being rigidly fastened to a shaft journaled in the frame of the machine, said shaft having an intermittent rotary motion, and means for giving said shaft said motion, said means comprising a gear wheel journaled on said shaft, said gear having a continuous rotary motion, a clutch, one jaw of which is fastened to said gear, the other jaw of which is slidably mounted, but rotatably fastened on said shaft, and means for moving said jaw in and out of engagement with said jaw on said gear.

2. In an automatic pinion cutting machine, a sliding member having an intermittent reciprocating motion, with means for giving said sliding member said motion, said means comprising a crank disk, a pin fastened on said disk, a link pivotally connected to said sliding member and said pin, said crank disk being rigidly fastened to a shaft journaled in the frame of the machine, said shaft having an intermittent rotary motion, and means for giving said shaft said motion, said means comprising a gear wheel journaled on said shaft, said gear having a continuous rotary motion, a clutch, one jaw of which is fastened to said gear, the other jaw of which is slidably mounted, but rotatably fastened on said shaft, and means for moving said jaw in and out of engagement with said jaw on said gear, said means comprising a lever, pivotally connected to the frame of said machine, and a cam rigidly fastened to a shaft having a continuous rotary motion.

ANDREW H. NEUREUTHER.

Witnesses:
E. ROTH,
ANDREW J. JOHNSON.